Nov. 29, 1955 V. K. ZWORYKIN 2,725,420

COLOR TELEVISION IMAGE REPRODUCTION

Filed July 20, 1951 3 Sheets-Sheet 1

INVENTOR
VLADIMIR K. ZWORYKIN
BY
ATTORNEY

Nov. 29, 1955 V. K. ZWORYKIN 2,725,420

COLOR TELEVISION IMAGE REPRODUCTION

Filed July 20, 1951 3 Sheets-Sheet 2

INVENTOR
VLADIMIR K. ZWORYKIN
BY
[signature]
ATTORNEY

Nov. 29, 1955 V. K. ZWORYKIN 2,725,420

COLOR TELEVISION IMAGE REPRODUCTION

Filed July 20, 1951 3 Sheets-Sheet 3

INVENTOR
VLADIMIR K. ZWORYKIN
BY
[signature]
ATTORNEY

United States Patent Office 2,725,420

Patented Nov. 29, 1955

2,725,420

COLOR TELEVISION IMAGE REPRODUCTION

Vladimir K. Zworykin, Princeton, N. J., assignor to Radio Corporation of America, a corporation of Delaware Application July 20, 1951, Serial No. 237,752

9 Claims. (Cl. 178—5.4)

This invention relates to color television systems and particularly to systems of this character employing a single multicolor kinescope for the image reproduction.

Among the different types of multicolor image-reproducing kinescopes which have been proposed for use is the type having a luminescent screen consisting of a multiplicity of phosphor areas arranged in substantially parallel strips. A tube of this general character is disclosed in U. S. Patent 2,310,863, granted February 9, 1943, to H. W. Leverenz and titled "Luminescent Screen."

The present invention relates to such a tube in which the phosphor strips are vertically arranged, generally in the manner shown in U. S. Patent 2,431,115, granted November 18, 1947, to A. N. Goldsmith and titled "Color Television System." It is necessary to control the electron beam by which the luminescent screen is excited so that it is properly registered with the various phosphor strips concurrently with the reception of video signals representing the particular colors produced by the respective phosphor strips.

Accordingly, it is an object of the present invention to provide an improved electron beam controlling system by means of which an electron beam may be caused to excite a series of phosphor strips concurrently with the reception of video signals representing the colors produced respectively by said strips.

Another object of the invention is to provide an electron beam control system for use in connection with a multicolor kinescope having a vertically arranged line phosphor screen, whereby signals developed by secondary electron emission produced by the beam in scanning the screen are employed to control the horizontal deflection of the beam in a manner to effect the desired registration of the beam with the different phosphor strips.

A further object of the invention is to provide an electron beam control system for use in conjunction with a multicolor kinescope having a vertically arranged line phosphor screen, whereby to effect registration of the beam with the different phopshor strips and to alternately energize and de-energize the beam so as to selectively excite the phosphor strips in a manner to effect horizontal dot interlacing in the reproduced raster.

In accordance with the invention, the luminescent screen of the multicolor kinescope consists of a plurality of vertical strips or areas of sub-elemental widths capable respectively of emitting light of the different component image colors. The screen is scanned in a series of horizontal lines by an electron beam so as to successively excite predetermined ones of the luminescent areas. The screen also is provided with a plurality of vertical signal-generating strips aligned with those luminescent areas capable of emitting light of a predetermined color. These signal-generating strips have a secondary electron emission ratio which is distinct from the rest of the screen which may be provided with a metallic backing. In a particular form of the invention the metallic backing of the luminescent screen may be in the form of an electron-pervious aluminum film or coating. In such a case, the signal-generating strips may be of carboniferous material. As a result of the scanning of the back of the luminescent screen there is produced a series of signals by the impingement of the electron beam upon the signal-generating strips. These signals may be segregated from the electrical effects produced by the impingement of the beam upon the rest of the screen. The segregated signals are employed in accordance with a feature of this invention to produce an additional incremental horizontal deflection of the electron beam so as to correct any misregistration of the beam with the different color-producing luminescent areas of the screen.

In accordance with another form of the invention, the different light-producing areas of the screen are so arranged relative to one another that they may be excited by the scanning electron beam in different groups by alternately energizing and de-energizing the beam for producing a horizontal dot interlacing of the reproduced raster. In the case where a two-to-one interlace is desired, the screen may be provided with twice as many luminescent strips than are required where no horizontal interlacing is required. Also, the order of occurrence of the areas is such that the same color sequence is produced, irrespective of whether the odd or even numbered groups of strips are scanned in successive fields. In this form of the invention facilities are provided for alternately energizing and de-energizing the electron beam at such a frequency in its scansion of its screen that alternate ones of the luminescent areas are excited in different scanning fields.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
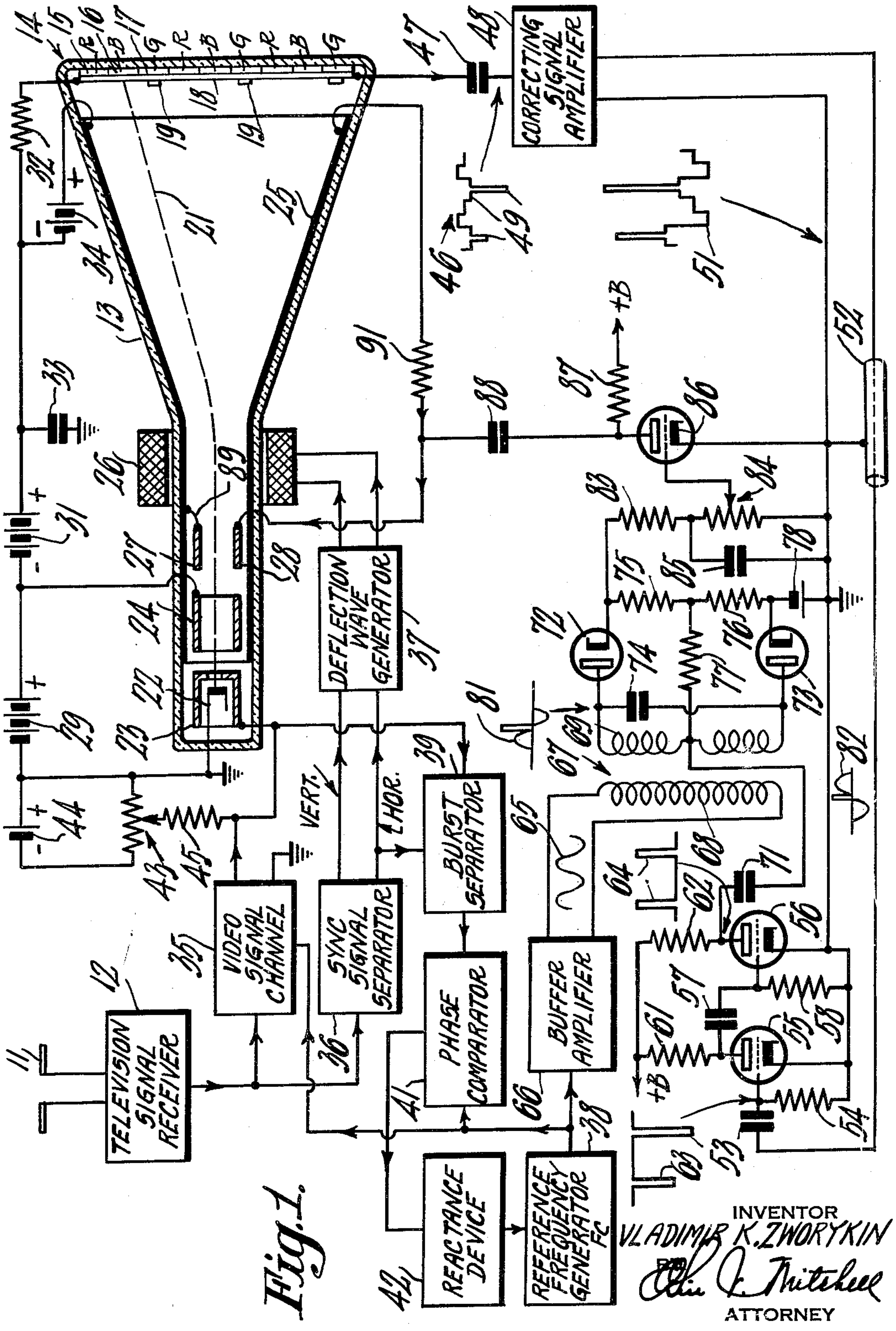
Figure 1 is a circuit diagram, partly in block form, of a television signal receiver and image-reproducing apparatus embodying one form of the present invention.

Reference now will be made particularly to Figure 1 for a description of one form of image-reproducing apparatus in which the invention may be embodied. The color television signals are intercepted by an antenna 11 and impressed upon a television receiver 12. It will be understood that this apparatus may be entirely conventional and operates to produce in its output circuit the composite color video and synchronizing signals. It is assumed that the illustrated form of the invention is embodied in an elemental multiplex television system of the type disclosed in an article titled "A six-megacycle compatible high-definition color television system" by RCA Laboratories Division, published in the RCA Review, vol. X, No. 4, December 1949, at page 504. In such a system the component color video signals are transmitted in rapid succession for each of the multiplicity of elemental areas of the picture. Such a system forms the subject matter of a copending application of John Evans, Serial No. 111,384, filed August 20, 1949, and titled "Color Television."

The color television image is reproduced by a multicolor kinescope 13 which in general may be of the type disclosed in the Leverenz and Goldsmith patents previously referred to. The kinescope is provided with a luminescent screen 14 consisting of a multiplicity of vertically arranged areas or strips such as 15, 16 and 17 capable respectively of emitting light of the different component image colors. The combined widths of at least three of these strips preferably should be no greater than the dimensions of an elemental area of the image to be reproduced.

The screen 14 also is provided with a metallic film or backing layer 18 on the side thereof which is to be impinged by the electron beam. The metallic plate 18 may be in the form of an aluminum coating or other suitable material having a secondary electron emission ratio which is appreciably greater than unity. Tubes having metallized luminescent screens of this general character are described in greater detail in an article titled "Improved cathode ray tubes with metal backed luminescent screens" by D. W. Epstein and L. Pensak, published in the RCA Review, volume VII, March 1946, at pages 5 to 10 inclusive.

In addition, the luminescent screen 14 includes a plurality of signal-generating strips such as 19 located on the metallic coating 18 and in alignment with each of the luminescent strips capable of emitting light of a predetermined color. In the present case, the signal-generating strips 19 are aligned with the green light-producing strips such as 17. Also, the signal-generating strips should be minimized in width so as to permit a maximum of the electron beam energy to excite the luminescent areas behind the signal-generating strip. The signal-generating strips may be produced by ruling the aluminum film 18 with carbon black or other suitable material having a secondary electron emission ratio which is appreciably less than unity.

The kinescope 13 also is provided with means such as an electron gun for developing an electron beam 21. The electron gun may be entirely conventional and only those parts which are necessary to an understanding of the present invention are shown schematically in the drawing. They comprise a cathode 22, an electron beam intensity control electrode 23 and a first, or accelerating, anode 24. The kinescope includes a second anode which conventionally is in the form of a wall coating 25 extending from the region of the electron gun to one adjacent to the luminescent screen 14. In the present invention the wall coating also comprises a secondary electron collector. It will be understood that the reference to a wall coating constituting the second anode or collector 25 is specifically for all-glass kinescopes and that it is intended to include the equivalent structures used in kinescopes having metallic shells. There also is provided a conventional deflection yoke 26 surrounding the neck of the kinescope adjacent to the conical section thereof. In addition, as part of the present invention, the kinescope is provided with a pair of auxiliary horizontal deflecting plates 27 and 28.

The different described electrodes of the kinescope 13 are energized suitably for operation by having the proper potentials impressed thereon. These potentials are derived in the usual manner from a suitable power supply which is schematically represented herein by a plurality of batteries. The cathode 22 is maintained substantially at ground or other fixed reference potential and the accelerating anode 24 is operated at some positive potential relative thereto by means of a battery 29. Similarly, the luminescent screen 14 is maintained at a still higher positive potential by means of a battery 31 connected to the backing plate 18 through a resistor 32. A capacitor 33 by-passes the batteries 29 and 31 to ground. In addition, the second anode or collector 25 is maintained at a higher positive potential than the screen 14 by means of a battery 34 so as to efficiently collect the secondary electrons emitted from the screen structure 14. A potential difference between the screen 14 and the collector 25 of several hundred volts ordinarily is adequate for this purpose.

The elemental multiplex color video signals derived from the television signal receiver 12 are impressed upon a video signal channel 35 and also upon a sync signal separator 36 in a conventional manner. It will be understood that the viedo signal channel includes such conventional apparatus as a plurality of sequentially controlled gating devices or their equivalents which may be similar to those disclosed in the RCA Review article "A six-megacycle compatible high-definition color television system" previously referred to. Inasmuch as such apparatus is known and does not form a part of the present invention, a more detailed disclosure of it has not been included. Those skilled in the art are familiar with gating devices of a character suitable for use as a color video signal demodulator, the essential function of which is to separate on a time division basis the different color representative video signals from one another. The demodulated color video signals derived from the video signal channel 35 are impressed upon the control grid 23 of the kinescope 13.

The sync signal separator 36 functions in the usual manner to separate the horizontal and vertical synchronizing pulses from the video signals and also from each other. Also conventionally, the horizontal and vertical synchronizing pulses are impressed upon corresponding deflection wave generators 37. These generators will be understood to be conventional and are synchronously controlled by the respective horizontal and vertical synchronizing pulses to produce the necessary substantially sawtooth wave energy for energizing the deflection yoke 26 so that the usual raster may be scanned by the electron beam 21 at the screen 14.

The image-reproducing apparatus embodying the present invention also includes a reference frequency generator 38 for producing a wave having a frequency $F_c$ corresponding to the repetition frequency of the color video signals. This generator may be of any desired form which is capable of producing a wave having a substantially sinusoidal form at a frequency of the order 3.5 to 4 megacycles per second, for example, which presently is used in color television systems of the character in which the illustrative form of the invention is embodied. A suitable generator is shown, for example, in the book titled "Wave Forms" published by McGraw-Hill Book Co., Inc., New York, New York, and appears in Figure 4–45 at page 143. Such a sine wave generator is capable of relatively stable operation at the desired frequency and, in addition, is readily susceptible of synchronous control. The reference frequency generator 38 is coupled to the video signal channel apparatus 35 to function in the demodulation of the color video signals as described in the RCA Review article "A six-megacycle compatible high-definition color television system." It also performs another function in accordance with this invention. This additional function will be described subsequently.

In order that apparatus such as the reference frequency generator 38 may be operated synchronously with the received color video signals and similar apparatus at the transmitting station there is transmitted, in addition to the conventional composite television signals, a burst consisting of several cycles at the color video repetition, or reference, frequency occurring during the blanking intervals immediately following each horizontal synchronizing pulse. In accordance with usual practice this burst of color video signal frequency is superimposed upon the horizontal blanking pedestals in the so-called "back porch" region.

A more complete disclosure of this and other types of color synchronizing systems which may be used in the operation of image-reproducing systems embodying this invention is given in a publication titled "Recent Developments in Color Synchronization in the RCA Color Television System" published February 1950 by Radio Corporation of America. Figure 9 of this publication refers particularly to the receiver apparatus. The burst type of color synchronizing forms the subject matter of a copending U. S. application of Alda V. Bedford, Serial No. 143,800, filed February 24, 1949, and titled "Synchronizing Apparatus."

In order that these bursts of energy at the reference frequency be utilized to synchronously operate the generator 38, there is provided a burst separator 39 having an input circuit coupled to the output circuit of the video signal channel 35. The burst separator is essentially a gating device. Accordingly, it is rendered operative only during the horizontal back porch intervals of the composite television signal under the control of the horizontal deflection wave energy. This control of the burst separator may be effected by coupling its control circuit to the horizontal output circuit of the sync signal separator 36.

As a result of the operation of the burst separator there is produced in its output circuit a short burst of energy having a frequency equal to the color video signal repetition, or reference, frequency. The output of the burst separator 39 and the output of the reference frequency generator 38 are impressed upon a phase comparator 41. Any phase difference between the two waves is effective to operate a reactance device 42 which is coupled to the generator 38 in the usual manner for controlling its frequency.

It is desirable that the correcting signals which are generated by the traversal of the electron beam 21 of the signal-generating strips 19 be made substantially independent of the video signals representing the image to be reproduced. Accordingly, it is necesary that the intensity of the beam be so controlled that, even in the reproduction of the darkest area of the image, a finite beam current is present, e. g., 5 to 10 microamperes. To effect this result, the electron gun of the kinescope 13 is suitably biased. This may be effected by proper manipulation of the brightness control facility which is customarily provided. In the present case, the brightness control includes a potentiometer 43 connected to a source of negative potential such as represented by a battery 44. The circuit impressing the video signals derived from the channel 35 upon the control grid 23 of the kinescope also is connected by a resistor 45 to the movable contact of the potentiometer 43. The adjustment of this potentiometer is made so as to control the image brightness, and hence the minimum beam current in the manner described.

As the electron beam 21 is deflected so as to scan a conventional raster at the screen electrode 14, its impingement upon the rear face of the screen effects the emission of secondary electrons which are collected by the anode electrode 25. Accordingly, there are developed voltages in the output resistor 32 connecting the aluminum coating 18 and the collector 25. Since the secondary electron emission ratio of the aluminum coating is greater than unit, it is seen that the voltages developed in the output resistor 32 are positive when the beam impinges upon the aluminum coating. Similarly, since the signal-generating strips 19 are assumed to be formed of carbon, the secondary electron emission ratio of which is less than unity, negative voltages are produced in the output resistor 32 in response to the impingement of the beam 21 upon these strips. Such a signal is represented by the wave 46 which is the voltage developed in a circuit including a capacitor 47 coupling the aluminium coating 18 and a correcting signal amplifier 48. The negatively extending pulses 49 represent the signals generated by the electron beam impingement of the strips 19.

As a practical consideration, the output resistor 32 preferably is relatively small because of the relatively large capacity of the electrode structure including the screen 14. An alternative to the small output resistor may be the employment of a relatively large amount of peaking correction in the amplifier 48. In the present case, however, the resistor 32 is assumed to be relatively small. Consequently, the output signal 46 is small, thereby requiring an amplification of several thousand in order that the minimum relative pulses 49 be given an amplitude of several volts. Accordingly, it will be understood that the correcting signal amplifier 48 includes a plurality of stages. It also will be assumed that the amplifier 48 has an odd number of stages.

The signal 51 which is derived from the amplifier 48, accordingly, not only is greatly amplified, but is of reversed polarity. The signal 51 is transferred through a delay line 52 which preferably is adjustable and is effective to produce a delay of the order of 0.2 microsecond. The output terminal of the delay line 52 is coupled by a capacitor 53 to an input resistor 54 and to the control grid of an electron tube 55 constituting the first of a two-stage clipper amplifier. A tube 56 constitutes a second stage of the clipper amplifier and its control grid is coupled to the anode of the tube 55 by a capacitor 57 and an input resistor 58. Load resistors 61 and 62 are connected respectively between the anodes of the clipper tubes 55 and 56 and a source of positive potential indicated at +B.

The first stage clipper amplifier tube 55 separates the correcting signal pulses from the rest of the signal 51, thereby producing pulses such as 63 in its output circuit. These pulses are reversed in polarity to corresponding ones of the signal 51. The second stage clipper amplifier tube 56 functions to produce a pair of correcting pulses 64 of positive polarity and of substantially uniform amplitude.

The correcting signal pulses 64 are compared in phase with a sinusoidal wave 65 derived from a buffer amplifier 66 which is connected to the output of the reference frequency generator 38. The phase comparison is made by a discriminator of the general type disclosed in a paper titled "Automatic frequency phase control of television sweep circuits" by E. L. Clark, published in the Proceedings of the IRE, volume 37, No. 5, May 1949, with reference particularly to Figure 2. This discriminator includes a transformer 67 having a primary winding 68 coupled to the buffer amplifier 66 and a secondary winding 69 having a center tap coupled by a capacitor 71 to the output circuit of the second stage clipper amplifier tube 56. The terminals of the secondary transformer winding 69 are connected respectively to the anodes of a pair of diodes 72 and 73. A capacitor 74 also is coupled between the terminals of the secondary winding 69 so as to tune it for resonance at a frequency having a desired relationship to the frequency of the pulses 64 and of the sinusoidal wave 65. The cathodes of the diodes 72 are coupled together by a series arrangement of load resistors 75 and 76. Also, a resistor 77 is connected between the center tap of the secondary winding 69 and the junction point between cathode resistors 75 and 76, thereby providing a direct current return circuit for the diodes. A comparatively small negative bias for the phase comparator is provided by a battery 78.

The phase comparator operates to develop waves 81 and 82 at the anodes of the respective diodes 72 and 73. These waves are composites of the sinusoidal wave 65 and the pulses 64. When these pulses occur at the zero transit points of the sinusoidal wave, no voltage is developed in the output of the discriminator. The delay line 52 is so adjusted that the described phase relationship of the pulses 64 and the wave 65 is achieved when operation of the kinescope 13 is such that the signal-generating strips 19 are impinged by the beam 21 at times corresponding to the modulation of the beam by video signals representing the green components of the image to be reproduced. In this case, no correction of the horizontal deflection of the beam 21 is necessary. Any deviation of the phase of the pulses 64 from described relationship to the wave 65 will effect the development in the output circuit of the discriminator of a voltage which is representative in polarity of the sense of the deviation and in amplitude of the magnitude of the deviation.

The output circuit of the phase comparator includes a series connection of a resistor 83 and a potentiometer 84. The potentiometer 84 is bypassed by a capacitor 85. The time constant of this circuit including the potentiometer 84 and the capacitor 85 is made to approximate the period of reproduction of an elemental area of the picture.

The adjustable contact of the potentiometer 84 may be manipulated to select the desired amplitude of control voltage developed in the output circuit of the discriminator for impression upon the control grid of a control voltage amplifier tube 86. The tube 86 is provided with a load circuit including a resistor 87 connected between the anode of the tube and a point of positive potential indicated at +B. The output of the tube 86 is coupled by a capacitor 88 to the auxiliary deflecting plate 28. The other auxiliary deflecting plate 27 is maintained at the same potential as the collector electrode wall coating 25, for example, by means of a connection 89 made internally of the kinescope 13.

The correcting voltage developed in the output circuit of the amplifier tube 86 is impressed upon the auxiliary deflecting plates 27 and 28 by means of an input resistor 91 effectively connected between these plates. One manner of making this connection is indicated in the drawing wherein one terminal of the resistor is connected to the auxiliary deflecting plate 28 and the other terminal to the collector electrode 25. Such a connection, however, is made in this disclosure primarily for the sake of simplicity. In actual practice, the connection of the resistor 91 to the plate 27 could be more easily accomplished externally of the kinescope by a connection to the positive terminal of the battery 34. In any case, it is seen that the developed correction voltages are impressed upon the auxiliary deflecting electrodes 27 and 28 so as to produce an additional horizontal deflection of the beam 21, whereby to effect the proper registration of it with the different luminescent areas of the screen 14. In order that the correcting voltages developed in the manner described be effective to produce this result, it is desirable that the time constant of the circuit, including the coupling capacitor 88 and the input resistor 91 be at least as great as the time required to scan a complete horizontal line of the image.

It will be appreciated that, since the auxiliary deflection of the beam necessary to effect the desired registration is never more than a fraction of an elemental picture area, the voltage impressed upon the plates 27 and 28 need not be large, even when the capacitance of these plates is of a low order of magnitude. It is a preferred practice, however, to control the amplifier gain of the correcting voltage producing apparatus in such a manner that this voltage always is less than that required to produce complete correction. By this means "hunting" is prevented in the operation of the system. It may be seen that, otherwise, an undesired hunting action might be produced because of the fact that the delay in the correction voltage developing circuits is greater than the time required for the beam to traverse one of the signal-generating strips. Accordingly, any correcting voltage produced by the transit of the beam over one of the strips is effective to alter the phase of the pulses derived from the beam transit over the next succeeding strips, thereby tending to produce hunting.

Figure 2:
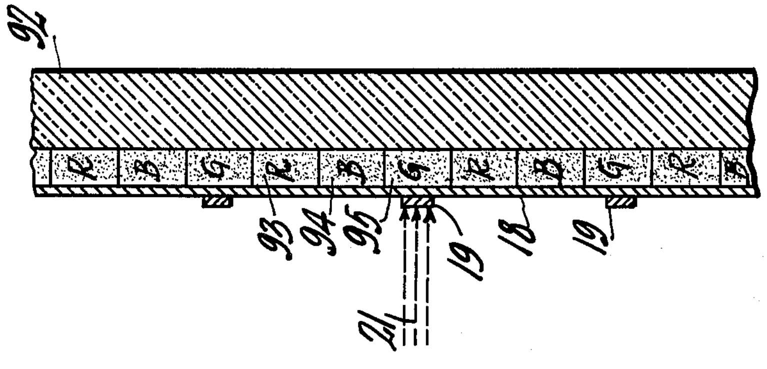
Figure 2 is an enlarged sectional view of a luminescent screen which may be employed with the form of the invention shown in Figure 1.

One form of a luminescent screen which may be employed in apparatus embodying the present invention is shown in detail to a grossly exaggerated scale to Figure 2 to which reference now will be made. The face, or transparent end wall 92 of the kinescope has deposited on the inner surface thereof phosphor areas such as 93, 94 and 95 capable, respectively, of emitting red, blue and green light when excited by an electron beam 21. These phosphors are laid down in the form of vertical strips and in groups of three substantially as shown. Preferably, the total width of each group of strips is of elemental area size.

On the back of the phosphor strips is deposited a layer of aluminum 18 as in the manner described in the Epstein and Pensak paper referred to, for example. The signal-generating strips 19 may be formed of carbon black lines, for example, ruled or otherwise applied to the surface of the aluminum film 18.

Figure 3:
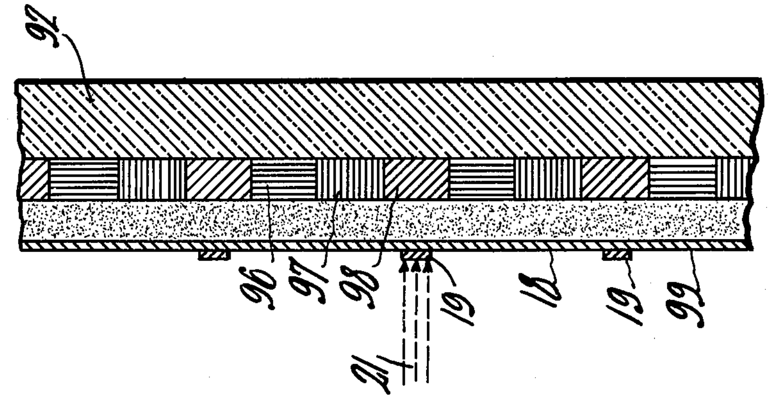
Figure 3 is an enlarged sectional view of a part of another luminescent screen structure which may be used in the form of the invention shown in Figure 1.

Another form of a luminescent screen which may be included in apparatus embodying the invention is shown in Figure 3 to which reference now will be made. In this case, a color filter comprising a multiplicity of vertically arranged strips such as the red, blue and green strips 96, 97 and 98, respectively, is affixed to the inner surface of the end wall 92. A substantially continuous phosphor layer 99 is applied to the inner surface of the strip color filter and is of a character to emit substantially white light when excited by an electron beam 21. In this form of the invention, it is seen that the white light which is produced by the screen at different points thereof appears as differently colored light when viewed by an observer, depending upon the color-transmitting character of the filter strips immediately in front of the excited area. The metallic film 18 then is applied to the phosphor layer 99 and the signal-generating strips 19 are affixed to the metallic layer substantially in the manner described.

The present invention may also be adapted for use in a color television system in which horizontal interlacing of the dots, or elemental areas, of the reproduced image is effected. Descriptions of horizontal dot interlacing are included in publications titled "Synchronization for Color Dot Interlace in the RCA Color Television System" and "Recent Developments in Color Synchronization in the RCA Color Television System" by Radio Corporation of America, October 1949 and February 1950, respectively. Horizontal dot interlacing systems also form the subject matter of a copending application of Randall C. Ballard, Serial No. 117,528, filed September 24, 1949, now Patent No. 2,678,348, issued May 11, 1954, and titled "Systems of Color Television."

Figure 4:
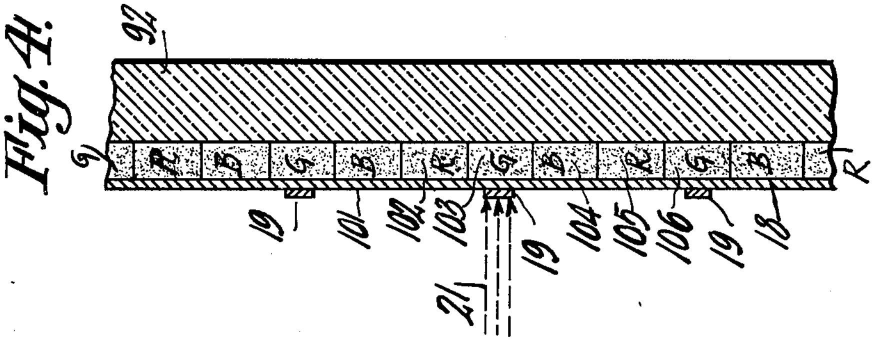
Figure 4 is an enlarged sectional view of a portion of a luminescent screen structure which may be used in the form of the invention shown in Figure 5.

Before describing a modification of the system embodying the present invention for use in effecting horizontal interlacing, a brief reference will be made to Figure 4 of the drawings hereof for a description of one type of luminescent screen with which the image-reproducing kinescope may be provided for such operation. In the case where a two-to-one dot interlace is to be effected, there are deposited, on the inner surface of the end wall 92 of the kinescope, light-producing areas which are double in number to those previously described for the same ratio of color change frequency to line frequency. Also, the order in which the luminescent areas appear in the screen is different from that previously described with reference to the embodiment of the invention shown in Figure 1. For example, one such group of luminescent areas may comprise blue, red and green light-producing phosphor areas 101, 102 and 103, respectively. However, in order to completely reproduce an image, two such groups of luminescent areas are required. For example, blue, red and green light-producing phosphor strips 104, 105 and 106 may be considered as functioning in groups with the immediately preceding group. The signal-generating strips 19 are placed on the metallic layer 18 in alignment with the green light-producing phosphor strips as in the other described forms of the luminescent screen. It will be understood that the general type of screen structure shown in Figure 3 also may be used in embodiments of the invention in which horizontal interlacing is to be effected. In such a case, the number of strips will be doubled and the order thereof changed in accordance with the teaching of Figure 4.

Figures 5, 6:
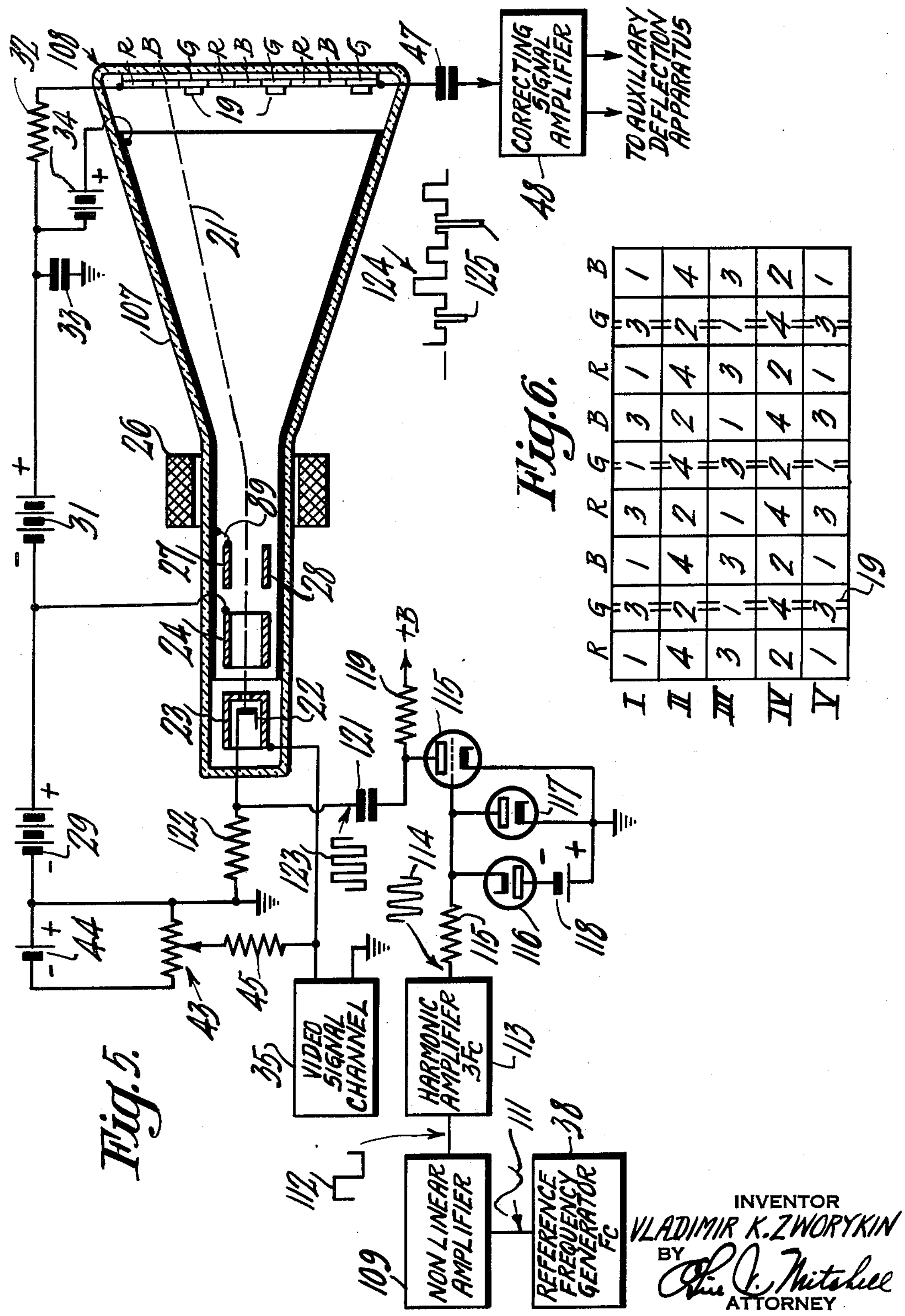
Figure 5 is a fragmentary circuit diagram, partly in block form, of an image-reproducing apparatus embodying another form of the invention in which horizontal dot interlacing may be effected; and, Figure 6 is a graphical illustration of the manner in which horizontal dot interlacing is effected by the apparatus of Figure 5.

Referring now to Figure 5 of the drawings, there will be described a modification of the apparatus of Figure 1 embodying the invention for effecting horizontal interlacing in the reproduced image. In this case, it will be assumed that a kinescope 107 is provided with a luminescent screen 108 of the general form shown in Figure 4. Otherwise, the structure of the kinescope may be identical with that of Figure 1.

In exciting the screen 108, one group of alternate screen strips is excited in one field and the other group of alternate strips is excited in a succeeding field. Accordingly, it is necessary, in order to effect the excitation of alternate screen strips, that the electron beam 21 be effectively blanked or de-energized periodically as it is traversing the strips which it is not desired to excite. Hence, the electron gun of the kinescope may be suitably keyed to effect this result. Alternatively, a gating tube may be included in the apparatus of the video signal channel 35. The apparatus for keying the kinescope gun includes a non-linear amplifier 109 coupled to the reference frequency generator 38. The sinusoidal wave 111 derived from the generator 38 is converted by the amplifier 109 into a substantially square wave 112. The non-linear amplifier 109 is coupled to a harmonic amplifier 133 which functions to selectively amplify the third harmonic of the reference frequency which is included in the wave 112 so as to produce in its output circuit a substantially sinusoidal wave 114 having a frequency which is three times the frequency of the wave 111 derived from the generator 38. The third harmonic wave 114 is coupled by a resistor 115 to the control grid of an output amplifier tube 115. A pair of inverted diodes 116 and 117, the former of which is negatively biased by means represented as a battery 118, are connected to the input circuit including the control grid of the tube 115 for the purpose of clipping the wave 114 suitably to give a substantially square form. The output circuit of the tube 115 includes a load resistor 119 connected between the anode of the tube and a source of positive potential +B. The output circuit is coupled, by a capacitor 121 and a cathode-biasing resistor 122, to the cathode 22 of the kinescope electron gun for the impression thereof of a keying voltage wave 123. By means of this keying voltage the electron gun of the kinescope is alternately energized and de-energized so that the proper phosphor strips may be energized in the desired manner.

In view of the foregoing description of the operation of the embodiment of the invention shown in Figure 1, it will be seen that the added operation of keying the electron beam by the described means and in the manner set forth will develop a correcting signal 124 in the output resistor 32. This signal has positive amplitudes in the form of periodic pulses representing the secondary electron emission from the screen 108 as a result of the excitation of the desired phosphor strips. In alternate intervals this signal has a substantially zero value. It is also seen that, during the periods in which the green phosphor strips are excited, there are produced correcting signal pulses 125 as a result of the impingement of the signal-generating strips 19. Also, having in mind the described manner in which the luminescent screen is excited by the keyed electron beam 21, it is seen that the frequency of the correcting signal pulses 125 is substantially the same as in the form of the invention shown in Figure 1. The generated signal 124 is utilized to effect an auxiliary deflection of the electron beam so as to maintain it in substantially precise registration with the strips of the luminescent screen 118, in substantially the same manner as described in connection with the operation of the apparatus of Figure 1.

The manner in which the apparatus of Figure 5 is operated to produce horizontal dot interlacing will be better understood by having additional reference to Figure 6. This figure is a representation of a typical raster of a television image which, for the purpose of this description, has been separated into horizontal lines and elemental areas. The raster contains an odd number of horizontal lines, e. g., I, II, III, IV, and V. Also, there are shown nine of the vertical strips designated by the letters R, G and B, representative of the red, green and blue colored light produced by the strips when excited by an electron beam. The arabic numerals 1, 2, 3 and 4 appearing in the different rectangular areas of the raster refer, respectively, to the first, second, third and fourth fields in which the raster is scanned. The rectangle in which the field designating numerals appear is intended to represent that part of the raster which is energized to emit light of the color individual to the different strips. Also, the signal-generating strips 19 are shown superimposed upon each one of the green phosphor strips.

The relationship between the reference frequency and the raster scanning frequencies determines the number of color cycles in the reproduced image. The reference frequency is selected so as to be equal to an odd multiple of one-half of the line scanning frequency. Accordingly, the third harmonic of the reference frequency also has a similar relationship to the horizontal scanning frequency. Therefore, it is seen that, by reason of this relationship, the reference frequency and also its third harmonic differs by half a period in its starting phase on lines of the raster which are scanned successively in point of time. Accordingly, it may be seen by reference to Figure 6 that, in line I for example, one group of alternate phosphor strips is energized while, in line III which is the next one scanned in point of time, the other group of phosphor strips is energized. Similarly, in the third line scanned in field I, which is line V of the raster, the same group of phosphor strips is excited as in line I. Furthermore, since an odd number of lines is included in the complete image or frame comprising two line interlaced fields in the conventional arrangement, it is seen that, in line II, which is the first line scanned in field 2, the same group of alternate phosphor strips which is scanned in line III in field 1 is excited. Also, the first group of alternate phosphor strips is scanned in line IV of field 2.

Thus, it is seen that, at the completion of the scansion of fields 1 and 2, one-half of the luminescent areas of the screen have been excited. It will be clear without further explanation that the remaining half of the screen areas will be excited during the following two fields 3 and 4. The described process then is repeated. In this manner, the desired horizontal dot interlacing may be effected.

Also, it may be determined from a further examination of Figure 6, with additional reference to the described relationship of the scanning and keying frequencies, that the beam registration correcting signals will be generated at the same frequency as in the embodiment of the apparatus shown in Figure 1 and in the manner described with reference to the apparatus of Figure 5. One group of signal-generating strips 19 is energized in the scansion of any horizontal line of the raster and the other group of strips in the scansion of the horizontal line of the raster next succeeding in point of time.

It may be seen, from the foregoing disclosure of the illustrated embodiments of the invention, that there is provided an improved electron beam-controlling system by means of which an electron beam may be controlled to excite a multiplicity of phosphor areas respectively capable of producing light of the different component image colors concurrently with the reception of video signals representing these colors. The improved electron beam-controlling system in accordancet with the invention functions by developing signals which are representative of the instantaneous beam positions, by virtue of a difference in secondary electron emission produced by different areas of the screen. Furthermore, the present invention provides a facility by means of which horizontal dot interlacing may be effected in the reproduced raster by periodically de-energizing the beam in order to selectively excite the desired screen areas. Also, the beam-controlling signals are developed in a system in which horizontal dot interlacing is effected in such a manner as to effect the desired control of the beam in its horizontal deflection.

It will be evident to those skilled in the art that the principles underlying the present invention, e. g., the generation of correcting signals by secondary electron emission at different ratios from different parts of a luminescent screen structure, may be embodied in forms other than those illustratively disclosed herein. For example, the correcting signals may be developed by super-imposing a relatively low amplitude, high frequency component on the video signal. In this case, the output derived from the metallic backing layer, with which the luminescent screen is provided, may be amplified with a tuned, narrow band, high frequency amplifier and the resulting amplified output then detected with a suitable phase detector. Such an arrangement will produce a pulse type of wave which may be employed for comparison in phase with a reference frequency wave by means of a discriminator substantially as described herein. It, also, is considered to be within the scope of the present invention to employ suitable computing networks from which may be derived the desired ratio between the secondary electron emissions from the different parts of the luminescent screen structure. For example, a pulse attenuator computer circuit of the type shown in Figure 3.14 at page 51 of "Electronic Instruments" by Greenwood, Holden and MacRae, published by McGraw-Hill Book Co., Inc., New York, N. Y., in 1948. Such apparatus would function to directly produce the ratio of the current in the metallic coating 18 to the current in the collector 25. Such apparatus would develop a pulse wave of constant amplitude. The amplitude would be determined by the relationship between the secondary electron emission ratio of the carbon signal-generating strips 19 and that of the aluminum coating 18.

The nature of the invention may be ascertained from the foregoing description of a number of illustrative embodiments thereof. The scope of the invention is set forth in the appended claims.

What is claimed is:

1. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

2. In a color television system, image-reproducing apparatus comprising, a multicolor kinescope having means producing an electron beam and deflecting it in a series of to and fro traces horizontally and vertically to scan a raster and a luminescent screen including a multiplicity of linear areas respectively capable of producing light of the different component image colors when excited by an electron beam, said screen being additionally provided with correction signal-generating strips aligned and coextensive with predetermined ones of said screen areas capable of emitting light of a particular color and having secondary electron emission ratios different from that of the rest of said screen, means to effect a distinctive modulation of said beam during one series of said scanning traces, an output circuit connected to said screen in which to develop signals representative of both said distinctive beam modulation and the beam traversal of said signal-generating strips, and means controlled by said correcting signals to effect an auxiliary deflection of said beam of suitable sense and magnitude to maintain substantially accurate beam-to-screen registration concurrently with the video signal modulation of said beam representing the image color corresponding to the screen area excited by the beam.

3. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, the difference from unity of the secondary electron emission ratios respectively of said signal-generating strips and of said luminescent screen areas except for said signal-generating strips being of opposite signs, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

4. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means including a pair of low capacity auxiliary deflection plates responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

5. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means including auxiliary beam-deflection apparatus responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

6. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam and a metallic backing comprising an electron-pervious aluminum film, said screen being additionally provided with correction signal-generating strips of carbon black material aligned and coextensive with predetermined ones of said screen areas capable of emitting light of a particular color and having a secondary electron emission ratio different from that of the rest of said screen, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

7. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, the secondary electron emission ratio of said luminescent screen except for said signal-generating strips being greater than unity, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit, and said generator to develop a beam-correcting deflection voltage representative of, and in response to, phase differences between said signals and said reference frequency wave, and means responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

8. In a color television system, image-reproducing apparatus comprising, a multicolor kinescope having means producing an electron beam and deflecting it horizontally and vertically to scan a raster and a luminescent screen including a multiplicity of vertical areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, the secondary electron emission ratio of said signal-generating strips being less than unity, a secondary electron-collecting electrode adjacent said screen, an output circuit connecting said screen and said collecting electrode in which to develop beam-correcting signals representative of the traversal of said strips by said beam, a reference frequency generator producing a wave having a frequency equal to the color video signal repetition frequency, means coupling said output circuit and said generator to develop a beam-correcting deflection voltage representative of, and in response to, phase differences between said signals and said reference frequency wave, and means responsive to said beam-correcting deflection voltage to control the horizontal deflection of said beam in a manner to effect substantially accurate beam-to-screen area registration concurrently with the modulation of said beam by the video signal representing the image color corresponding to the screen area excited by the beam.

9. In a color television system, image-reproducing apparatus comprising, a multicolor kinescope having means producing an electron beam and deflecting it horizontally and vertically to scan a raster and a luminescent screen including a multiplicity of linear areas respectively capable of producing light of the different component image colors when excited by an electron beam, said screen being additionally provided with correction signal-generating strips aligned and coextensive with predetermined ones of said screen areas capable of emitting light of a particular color and having a secondary electron emission ratio different from that of the rest of said screen, an output circuit connected to said screen to develop signals produced by the beam traversal of said screen areas and strips, said developed signals including correcting signals of opposite polarity to that of all others of said developed signals, means coupled to said output circuit to develop a beam-correcting deflection wave corresponding to said correcting signals produced by the beam traversal of said strips, and means controlled by said beam-correcting deflection wave and responsive only to signals having the polarity of said correcting signals to effect an auxiliary deflection of said beam of a character to effect substantially accurate beam-to-screen area registration concurrently with the modulation of said beam by the video signal representing the image color corresponding to the screen area excited by the beam.

References Cited in the file of this patent

UNITED STATES PATENTS

| | | |
|---|---|---|
| 2,431,115 | Goldsmith | Nov. 18, 1947 |
| 2,490,812 | Huffman | Dec. 13, 1949 |
| 2,530,431 | Huffman | Nov. 21, 1950 |
| 2,545,325 | Weimer | Mar. 13, 1951 |
| 2,587,074 | Sziklai | Feb. 26, 1952 |
| 2,621,245 | Kell | Dec. 9, 1952 |
| 2,634,325 | Bond | Apr. 7, 1953 |
| 2,644,855 | Bradley | July 7, 1953 |